US009239431B1

(12) United States Patent
Rakich et al.

(10) Patent No.: US 9,239,431 B1
(45) Date of Patent: Jan. 19, 2016

(54) ATHERMALIZATION OF RESONANT OPTICAL DEVICES VIA THERMO-MECHANICAL FEEDBACK

(75) Inventors: Peter T. Rakich, Albuquerque, NM (US); Gregory N. Nielson, Albuquerque, NM (US); Anthony L. Lentine, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 950 days.

(21) Appl. No.: 13/306,453

(22) Filed: Nov. 29, 2011

(51) Int. Cl.
*G02B 6/26* (2006.01)
*G02B 6/293* (2006.01)
*G02B 6/12* (2006.01)

(52) U.S. Cl.
CPC ........ *G02B 6/29338* (2013.01); *G02B 6/12026* (2013.01); *G02B 6/29398* (2013.01)

(58) Field of Classification Search
None
See application file for complete search history.

(56) References Cited

U.S. PATENT DOCUMENTS

| 4,583,227 | A  | * | 4/1986  | Kirkby ............................ 372/32   |
| 6,377,723 | B1 | * | 4/2002  | Saito et al. ..................... 385/15   |
| 6,522,809 | B1 | * | 2/2003  | Takabayashi et al. .......... 385/37  |
| 6,865,323 | B2 | * | 3/2005  | Samiec et al. .................. 385/50  |
| 7,187,818 | B2 | * | 3/2007  | Grobnic et al. ................. 385/14  |
| 2003/0086674 | A1 | * | 5/2003 | Yan et al. ..................... 385/137 |
| 2003/0142709 | A1 | * | 7/2003 | Ash et al. ....................... 372/32 |
| 2003/0179787 | A1 |   | 9/2003 | Woodley |
| 2007/0241635 | A1 |   | 10/2007 | Hunter et al. |
| 2009/0269002 | A1 | * | 10/2009 | Wong et al. ..................... 385/12 |
| 2010/0183312 | A1 | * | 7/2010 | Bolla ................. G02B 6/12007 398/85 |
| 2010/0266233 | A1 | * | 10/2010 | Morris ................ G01C 19/721 385/2 |
| 2011/0102804 | A1 | * | 5/2011 | Lipson et al. ................. 356/480 |
| 2012/0076166 | A1 | * | 3/2012 | Schliwa et al. .......... 372/45.011 |

FOREIGN PATENT DOCUMENTS

JP  3331180 B2 * 10/2002

OTHER PUBLICATIONS

Machine Translation of JP3331180 B2, Oct. 7, 2002.*
Okamoto et al., "Fabrication of 64 x 64 arrayed-waveguide grating multiplexer on silicon", Electronics Letters, vol. 31, No. 3, Feb. 2, 1995, pp. 184-186.
K. Okamoto, "Fundamentals of Optical Waveguides, Chapter 4, Coupled Mode Theory", Academic Press, 2000.
Tsay et al., "Theory of the Temperature Derivative of the Refractive Index in Transparent Crystals", Physical Review B, vol. 8, No. 6, Sep. 15, 1973, pp. 2688-2696.

* cited by examiner

*Primary Examiner* — Hemang Sanghavi
(74) *Attorney, Agent, or Firm* — Aman Talwar

(57) ABSTRACT

A passively athermal photonic system including a photonic circuit having a substrate and an optical cavity defined on the substrate, and passive temperature-responsive provisions for inducing strain in the optical cavity of the photonic circuit to compensate for a thermo-optic effect resulting from a temperature change in the optical cavity of the photonic circuit. Also disclosed is a method of passively compensating for a temperature dependent thermo-optic effect resulting on an optical cavity of a photonic circuit including the step of passively inducing strain in the optical cavity as a function of a temperature change of the optical cavity thereby producing an elasto-optic effect in the optical cavity to compensate for the thermo-optic effect resulting on an optical cavity due to the temperature change.

8 Claims, 7 Drawing Sheets

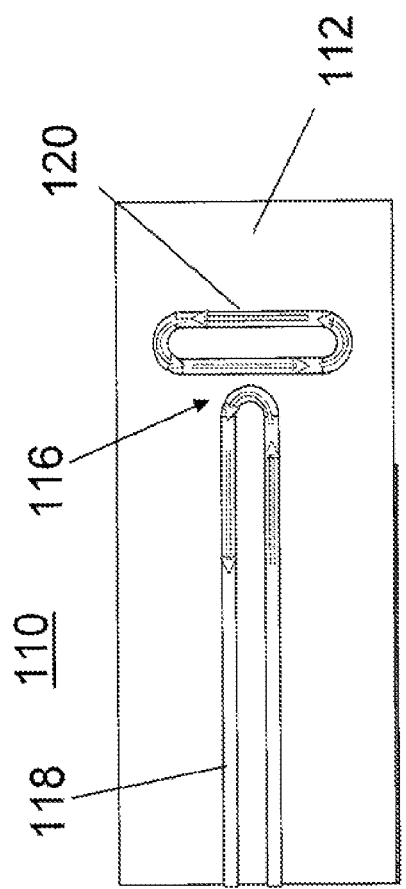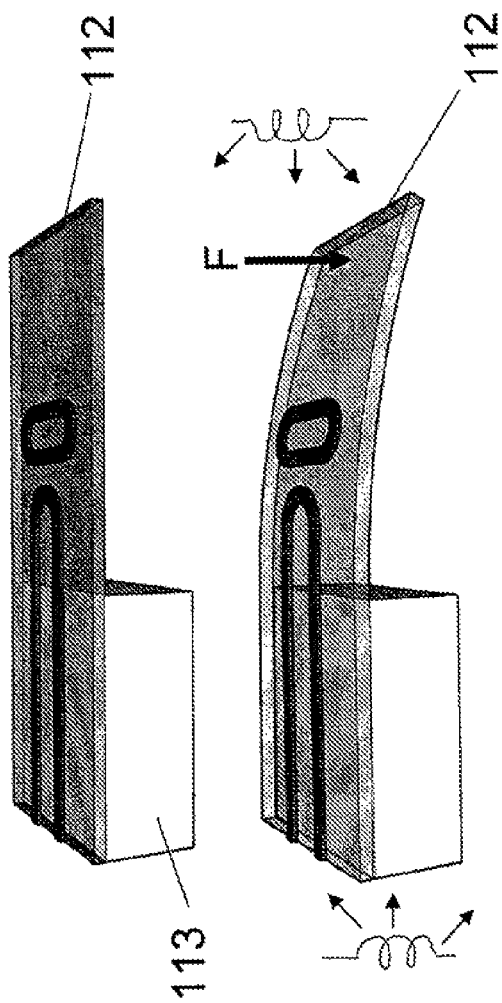
FIG. 4A  FIG. 4B  FIG. 4C

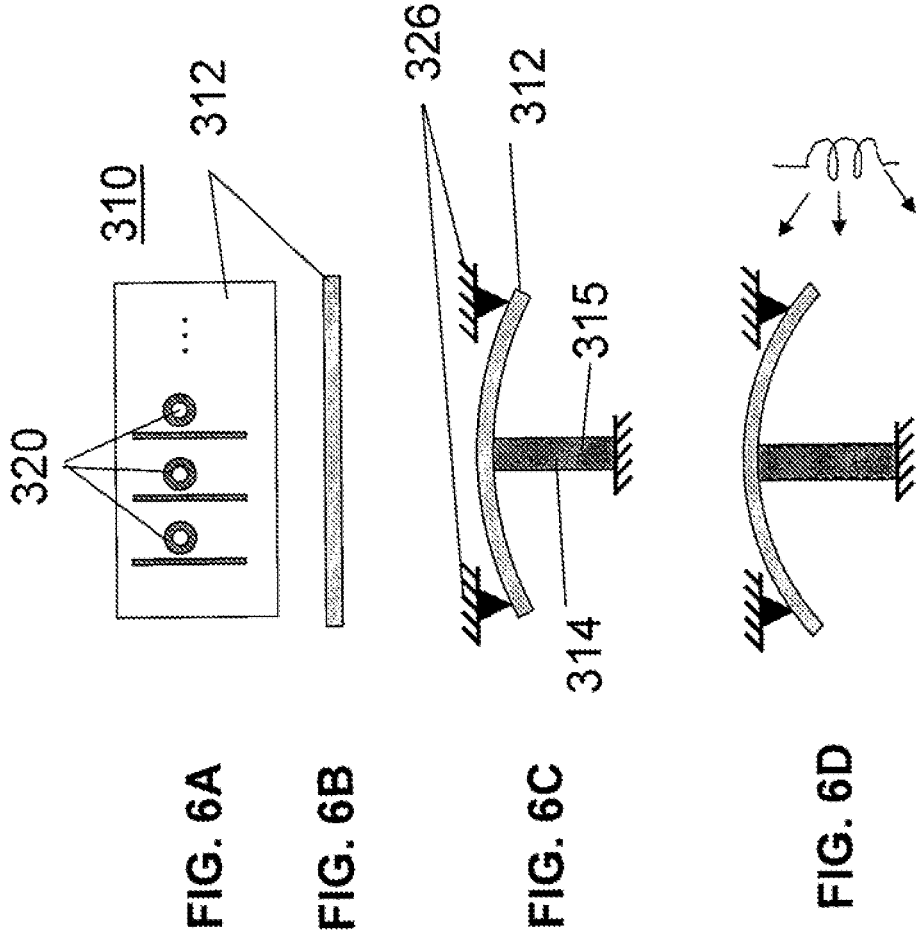

ATHERMALIZATION OF RESONANT OPTICAL DEVICES VIA THERMO-MECHANICAL FEEDBACK

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention.

FIELD OF THE INVENTION

The present invention relates to the field of integrated photonics and, more particularly, to a device and method for achieving athermalization of resonant optical devices.

BACKGROUND OF THE INVENTION

The field of integrated photonics seeks to miniaturize optical components, such as modulators, resonators, filters and waveguides, and integrate such optical components onto a single chip in the form of an optical circuit. Many researchers in the field of integrated photonics hope to revolutionize optics in much the same way that miniaturization and integration of the circuits has revolutionized electronics. In the context of high performance computing, for example, optical interconnects would be advantageous in order to improve the bandwidth of communication between computational nodes in supercomputers, and potentially decrease the power consumption of such large scale computers.

In analogous manner to the microelectronics industry, the fabrication of integrated photonic circuits through lithographic, and other highly manufacturable means, seeks to: (1) reduce cost and size, (2) increase complexity, and (3) improve the overall performance of optical systems. Numerous researchers have placed a great deal of effort toward the development of high refractive index contrast (HIC) photonic circuits for their ability to further reduce component sizes and improve performance even further.

While progress has been made in the field of HIC photonic circuits toward the development of practical and low-loss waveguides, high performance filters, resonators and modulators, numerous fundamental challenges remain before widespread implementation of such photonic circuits can occur. For example, HIC photonic circuits, such as those made from silicon, are extremely sensitive to their environment.

Since the refractive index of silicon changes very rapidly with temperature due to the thermo-optic effect, it can be challenging to stabilize the resonance frequency of an optical cavity of a photonic circuit against variations in temperature. If optical cavities were used on microprocessors in order to filter and route optical data on chips, for example, large variations in the local processor temperatures during operation may detune those cavities from their intended resonant frequencies. All of these devices are notoriously temperature sensitive, as changes in both device dimension and refractive index severely impact the performance of the system. Active thermal compensation in the form of a thermal sensor, a heater and a feedback loop, has been pursued as a solution to this problem, however, this is a costly, complex and inefficient solution requiring additional power and components.

SUMMARY

Disclosed herein is a passive device that achieves optical cavity athermalization through thermo-mechanical feedback. The device relies on the principle that cavity tuning of equal magnitude and opposite sign can be generated through mechanical deformation of an optical cavity. Mechanically deforming an optical cavity of a photonic circuit as a function of temperature compensates for the thermo-optic thermal sensitivities of the photonic circuit. The passive device does not require any additional power dissipation. By athermalizing the optical cavity, the refractive index and the frequency of the cavity remains substantially constant over a range of temperature. Optical cavity athermalization is achieved by passively stabilizing the frequency of a cavity of a photonic circuit against thermal environmental variations.

According to one aspect, a passively athermal photonic system comprises a photonic circuit including a substrate and an optical cavity defined on the substrate; and a passive temperature-responsive element for inducing strain in the optical cavity of the photonic circuit to compensate for a thermo-optic effect resulting from a temperature change in the optical cavity of the photonic circuit.

According to another aspect of the invention, a passively athermal photonic system comprises a thermal bimorph and an optical cavity defined on the thermal bimorph, wherein, the thermal bimorph induces strain in the optical cavity as a function of temperature to compensate for a temperature dependent thermo-optic effect in the optical cavity.

According to yet another aspect of the invention, a method of passively compensating for a temperature dependent thermo-optic effect resulting on an optical cavity of a photonic circuit is provided. The method comprises the step of passively inducing strain in the optical cavity as a function of a temperature change of the optical cavity thereby producing an elasto-optic effect in the optical cavity to compensate for the thermo-optic effect resulting on an optical cavity due to the temperature change.

According to still another aspect of the invention, a passively athermal system is provided. The system includes a resonant optical device and a passive temperature-responsive means for inducing strain in the resonant optical device to compensate for a thermo-optic effect resulting from a temperature change in the resonant optical device.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIGS. 4A, 4B and 4C are a top plan view and perspective views that depict a passively athermal system including a photonic circuit, which is shown schematically, according to a second exemplary embodiment of the invention.

FIGS. 6A, 6B, 6C and 6D are top plan and side elevation views that depict a passively athermal system including a photonic circuit, which is shown schematically, according to a fourth exemplary embodiment of the invention.

DETAILED DESCRIPTION OF THE INVENTION

Although the invention is illustrated and described herein with reference to specific embodiments, the invention is not intended to be limited to the details shown. Rather, various modifications may be made to the illustrated embodiments within the scope and range of equivalents of the claims and without departing from the invention. Also, the embodiments selected for illustration in the figures are not shown to scale and are not limited to the proportions shown.

Figure 1:
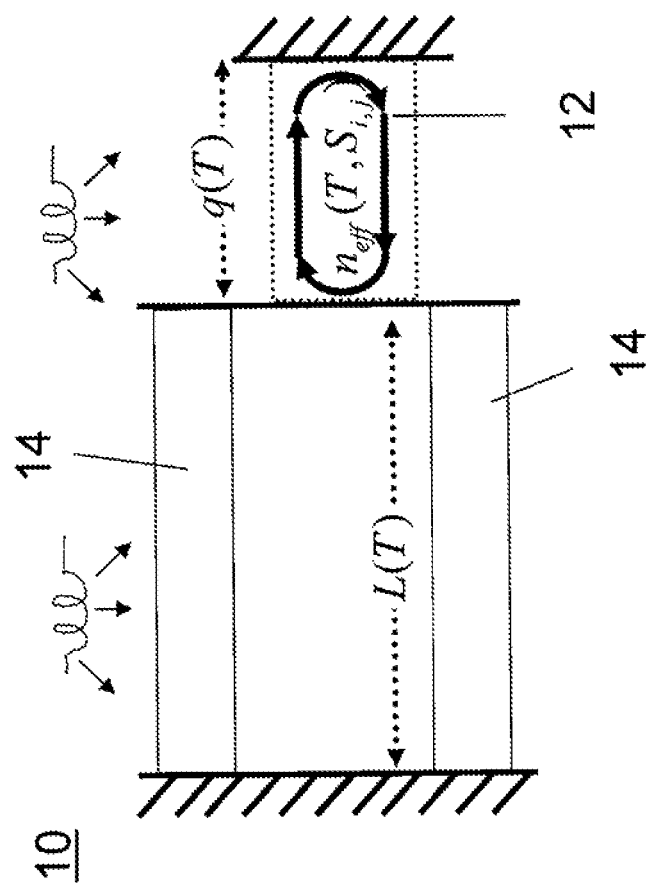
FIG. 1 is a general representation of a passively athermal system including a photonic circuit, which is shown schematically, according to a first exemplary embodiment of the invention.

FIG. 1 is a general representation of a passively athermal photonic system 10 according to a first example embodiment. The system 10 includes a photonic circuit 12 and a temperature-responsive load means 14 for applying a mechanical load onto the photonic circuit 12. In this embodiment, the temperature-responsive load means 14, which has a variable length (L) that is a function of temperature (T), applies a uniform compressive force onto the left-hand surface of the photonic circuit 12 depending upon the temperature of the load means 14. As the temperature increases (the heat source is represented symbolically), the length (L) of the load means 14 also increases, thereby compressing the photonic circuit 12. The compressive force induces strain in the optical cavity of the photonic circuit 12.

The photonic circuit 12 includes a silicon or silica substrate and an optical cavity (not shown) that is formed, defined or positioned on the substrate.

It should be understood that the material of the photonic circuit may vary. Also, the load means 14 may differ from that shown in FIG. 1. For example, the load means 12 may apply a point load, an intermediate load, a uniform load, a non-uniform load, a cantilever load, stress, or strain, for example, onto any surface or surfaces of the substrate of the photonic circuit 12.

Both induced strain ($S_{ij}$) and temperature (T) of the optical cavity of the photonic circuit 12 affect the refractive index ($n_{eff}$) of the optical cavity. The resonance frequency ($\omega$) of the optical cavity of the circuit 12 is a function of the effective refractive index ($n_{eff}$) of the substrate of the photonic circuit 12 and a q factor, which is treated as a constant. Thus, induced strain ($S_{ij}$) and temperature (T) of the optical cavity also affect the resonance frequency ($\omega$) of the optical cavity.

According to the equation shown below, the effective refractive index ($n_{eff}$) is equivalent to the sum of the initial refractive index ($n_0$), the change of refractive index ($n_{eff}^{to}$) due to a temperature change (referred to as a thermo-optic effect), and the change of refractive index ($n_{eff}^{om}$) due to an induced strain ($S_{ij}$) (referred to as an elasto-optic effect).

$$n_{eff}(S_{i,j}) = n_o + \Delta n_{eff}^{om}(S_{i,j}(T)) + \Delta n_{eff}^{to}(T)$$

The change of refractive index ($n_{eff}^{to}$) due to a temperature change (dn/dT) is a function of temperature (T). A widely accepted theory behind the temperature dependence of the index of refraction can be found in "Theory of the Temperature Derivative of the Refractive Index in Transparent Crystals," Tsay et. al., *Physical Review B* 8, pp. 2688-2696, 1973. This theory attempts to explain the temperature dependence of the index of refraction (i.e., dn/dT) on a molecular level. It attributes the derivative to two distinct physical effects: thermal expansion and the thermal occupancies of the energy levels in the atoms.

The change of refractive index ($n_{eff}^{om}$) due to strain ($S_{ij}$) is a function of strain ($S_{ij}$) that is applied to the substrate of the photonic circuit 12. The strain ($S_{ij}$) is a function of the temperature (T) of the temperature-responsive load means 14. The arrows depicted in the photonic circuit 12 represent the induced strain in the optical cavity of the photonic circuit 12. The strain ($S_{ij}$) induced deformation of the optical cavity of the photonic circuit 12 changes the geometry of the optical cavity, which contributes to a change in the refractive index of the optical cavity. Strain ($S_{ij}$) also modifies the refractive index of a waveguide core and cladding through the elasto-optic effect, resulting in a change of the refractive index of the optical cavity.

The change of refractive index ($n_{eff}^{to}$) due to a temperature change and the change of refractive index ($n_{eff}^{om}$) due to an induced strain ($S_{ij}$) can be designed to be substantially equal and opposite values, which tend to cancel out each other at least over a range of temperatures of about 0 degrees Celsius to about 70 degrees Celsius. By inducing a strain so that $n_{eff}^{om}$ is equal and opposite to $n_{eff}^{to}$, the effective refractive index ($n_{eff}$) is equivalent to the initial refractive index ($n_0$). Thus, the effective refractive index ($n_{eff}$) of the optical cavity of the photonic circuit 12 remains relatively unchanged despite the temperature change. The resonance frequency ($\omega$) of the optical cavity of the photonic circuit 12 also remains unchanged because the resonance frequency ($\omega$) is a function of the refractive index ($n_{eff}$), resulting in a passively athermal photonic circuit 12.

Figure 2:
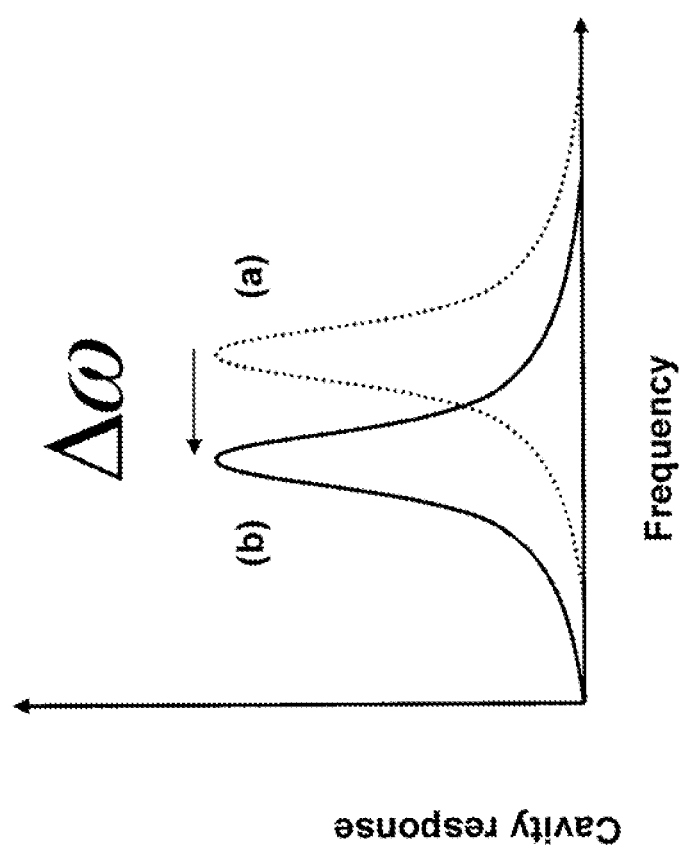
FIG. 2 is a graph of cavity response versus frequency that depicts a shift in cavity frequency due to a temperature increase.
Figure 3:
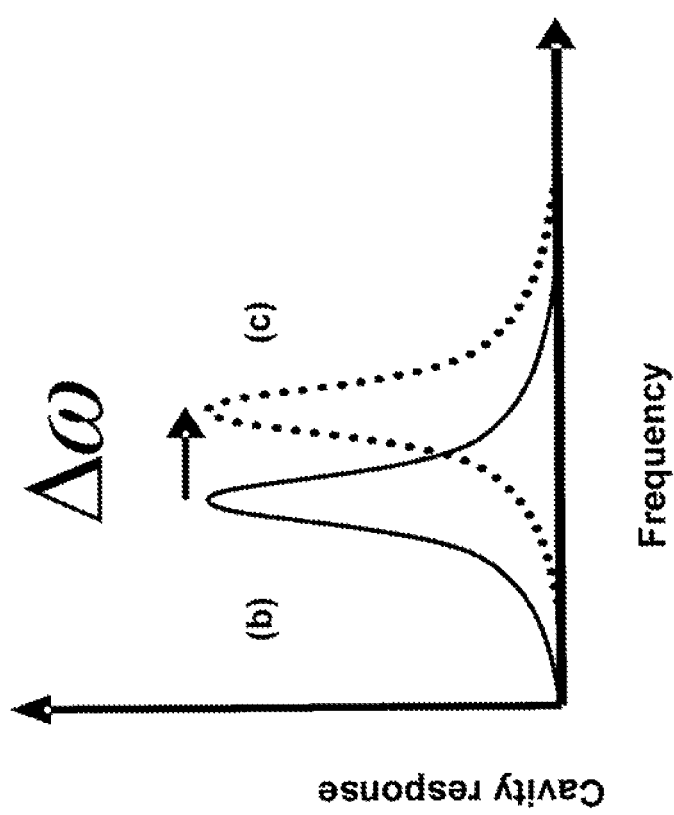
FIG. 3 is a graph of cavity response versus frequency that depicts a shift in cavity frequency due to a strain increase.

FIG. 2 is a graph of cavity response versus frequency that depicts a shift in cavity frequency due to a temperature increase. As the temperature of the optical cavity of the circuit 12 increases, its cavity resonance frequency decreases (note shift from a to b). Stated another way, heating the optical cavity decreases its effective refractive index ($n_{eff}$), and such a decrease causes a red-shift of the cavity frequency. FIG. 3 is a graph of cavity response versus frequency that depicts a shift in cavity frequency due to an increase in the strain applied to the optical cavity of the circuit 12. As strain increases, it can be seen that the cavity frequency increases (note shift from b to c). Stated another way, straining the optical cavity increases its effective refractive index ($n_{eff}$), and such an increase causes a blue-shift of the cavity frequency. If the temperature-responsive load means 14 is configured to compensate for any decrease of the cavity frequency due to temperature in an equal and opposite manner, the cavity frequency shifts shown in FIGS. 2 and 3 will tend to offset one another.

FIGS. 4A-4C depict a passively athermal photonic system 110 according to a second example embodiment. FIG. 4A is a top plan view of the system in the absence of strain, FIG. 4B is a side elevation view of the system in the absence of strain, and FIG. 4C is a side elevation view of the system under an applied strain generated by the temperature-responsive load means.

The passively athermal system includes a photonic circuit 112 and temperature-responsive load means (depicted as a downward-extending vertical arrow in FIG. 4C) for applying a cantilever load onto the photonic circuit 112. One end of the photonic circuit 112 is fixedly mounted to a member 113 such that the fixed end of the photonic circuit 112 can not bend when a force is applied to the opposing free end of the photonic circuit 112. Though not explicitly shown, the temperature-responsive load means expands with increasing temperature and contracts with decreasing temperature. The temperature-responsive load means of FIG. 4C may be a temperature-responsive post, such as the post 315 that is shown in FIGS. 6A-6D.

The photonic circuit 112 includes an optical ring resonator 116. The optical ring resonator 116 includes an inlet/outlet waveguide 118 and an optical ring cavity 120. As depicted by the arrows in FIG. 4A, in operation, light of the appropriate wavelength is directed through the inlet of the inlet/outlet waveguide 118. The light enters the inlet/outlet waveguide 118 and then enters the optical ring cavity 120 that is evanescently coupled to the inlet/outlet waveguide 118. The light builds up in intensity over multiple round-trips around the ring cavity 120 due to resonance. The light is then outputted back to the inlet/outlet waveguide 118. Since only some wavelengths of the light resonate within the ring cavity 120, the ring resonator 116 functions as a filter.

As best shown in FIG. 4C, when a heat source is applied to the system, the passive temperature-responsive load means of the system (not shown) automatically applies a cantilever force 'F' onto the photonic circuit 112. The force 'F' induces strain in the photonic circuit 112. In other words, as the cantilever is displaced from the position in FIG. 4B to the position shown in FIG. 4C, the cantilever deforms and the induced strain in the ring cavity 120 produces a frequency shift.

The induced strain in the ring cavity 120 tends to compensate for the increase in temperature, so that the refractive index ($n_{eff}$) and the resonance frequency ($\omega$) of the optical cavity 120 of the photonic circuit 112 remain substantially constant. As noted previously, the resonance frequency ($\omega$) of the optical cavity of the photonic circuit is a function of the strain that is applied to the optical cavity. As the temperature subsides, the cantilever force will also subside. As the temperature and force subside in a linear fashion, the refractive index ($n_{eff}$) and the resonance frequency ($\omega$) of the optical cavity 120 tend to remain constant. Generally, the effects on the refractive index ($n_{eff}$) and the resonance frequency ($\omega$) of the optical cavity 120 due to the elasto-optic effect (i.e., due to the cantilever force), offset the effects on refractive index ($n_{eff}$) and the resonance frequency ($\omega$) as a result of the thermo-optic effect (i.e., due to the temperature increase).

Figure 5A:
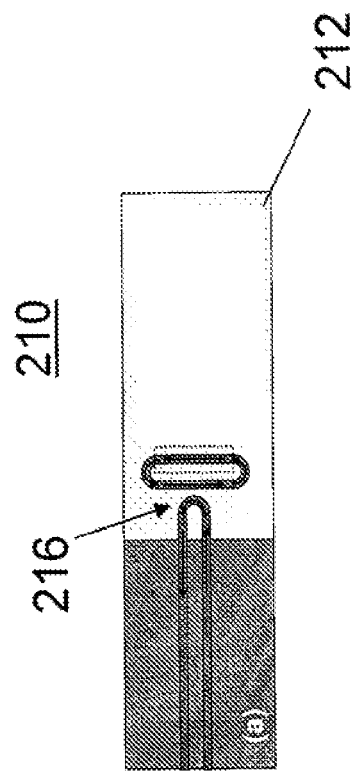
FIGS. 5A, 5B and 5C are top and side elevation views that depict a passively athermal system including a photonic circuit in the form of a thermal bimorph, according to a third exemplary embodiment of the invention.
Figure 5B:
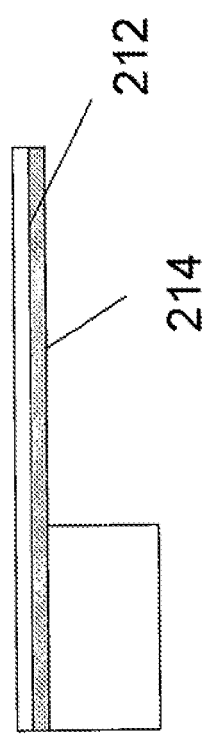
Figure 5C:
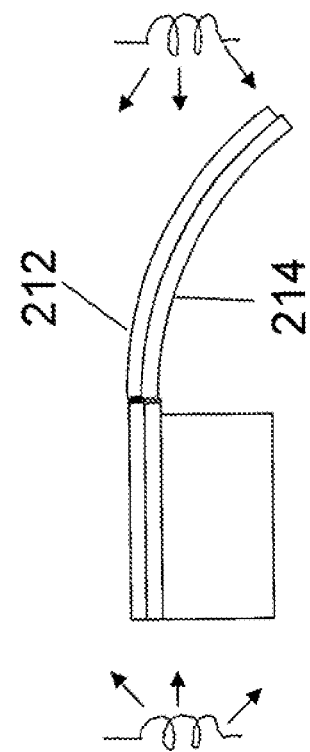

FIGS. 5A-5C depict a passively athermal system 210 according to a third exemplary embodiment of the invention. FIGS. 5A and 5B are top plan and side elevation views, respectively, of the system and FIG. 5C is a side elevation view of the system that is exposed to a heat source (shown symbolically). The system 210 is similar to the system 110 of FIGS. 4A-4C, however, the photonic circuit 212 of the system 210 includes a multi-layer thermal bimorph and the system 210 does not include a separate temperature-responsive load means. Otherwise, the previously described details of the system 110 apply equally to the system 210 of FIGS. 5A-5C.

The system 210 includes a photonic circuit 212, the substrate of which is provided in the form of a thermal bimorph. The lower layer 214 of the thermal bimorph is the temperature-responsive load means that induces strain in the photonic circuit 212 as a function of temperature (i.e., the elasto-optic effect). The optical ring resonator 216, which is substantially the same as the optical ring resonator 116 of FIGS. 4A-4C, is positioned on the top layer of the bimorph. The elasto-optic effect produced by the bimorph compensates for the thermo-optic effect on the effective refractive index ($n_{eff}$) and the resonance frequency ($\omega$) of the optical cavity of the ring resonator 216. Thus, the effective refractive index ($n_{eff}$) and the resonance frequency ($\omega$) of the optical cavity of the ring resonator 216 remain substantially constant at least over a range of temperatures. The temperature range may be about 0 degrees Celsius to about 70 degrees Celsius, for example.

The thermal bimorph is configured to induce strain upon itself as a function of temperature. Thus, by utilizing a thermal bimorph, a separate temperature-responsive device (like item 14) that strains the photonic circuit is not required. As described in U.S. Patent App. Pub. No. 2007/0241635, which is incorporated by reference herein, thermal bimorphs are structures which exhibit a thermally-induced bending response. The bending response results from stresses within the structure. The stresses arise when, in response to thermal changes, at least two of the layers within the structure expand or contract by differing amounts. This differential expansion is usually caused by layer-to-layer variations in the thermal expansion coefficient (TEC). When heated, the structure bends in the direction of the layer with the lower TEC.

The TEC's of the bimorph layers are selected such that at least over a range of temperatures, the change of refractive index ($n_{eff}^{to}$) due to the thermo-optic effect and the change of refractive index ($n_{eff}^{om}$) due to the elasto-optic effect are substantially equal and opposite values.

FIGS. 6A-6D depict a passively athermal photonic system 310 according to a fourth exemplary embodiment of the invention. FIGS. 6A and 6B are top plan and side elevation views, respectively, of a photonic circuit 312 of the system 310. FIG. 6C is a side elevation view of the overall system 310 and FIG. 6D is a side elevation view of the overall system 310 when it is exposed to an elevated temperature (shown symbolically). The system 310 is similar to the system 110 of FIGS. 4A-4C, however, the photonic circuit 312 of the system 310 includes a plurality of optical cavities 320 (three shown) and the systems have different temperature-responsive load means for inducing strain in the optical cavities. Otherwise, the previously described details of the system 110 apply equally to the system 310 of FIGS. 6A-6C.

The system 310 includes a photonic circuit 312 including a substrate, a plurality of optical cavities 320 formed on the substrate, and temperature-responsive load means 314 for applying a single point load onto the center of the photonic circuit 312. The temperature-responsive load means 314 is provided in the form of a post 315 that expands with increasing temperature and contracts with decreasing temperature. The free end of the post 315 is positioned against the center of the photonic circuit 312, whereas the other end of the post 315 is fixed. Each end of the photonic circuit 312 is contacted by a fixed point 326. The photonic circuit 312 may be arranged in a pre-strained state, as shown in FIG. 6C. Alternatively, the photonic circuit 312 does not have to be arranged in a pre-strained state.

As shown in FIG. 6D, at an elevated temperature (shown symbolically), the expanding post 315 (original post length shown in broken lines) urges the center of the photonic circuit 312 in an upward direction against the fixed points 326. The expanding post 315 and the fixed points 326 cause a bending moment in the photonic circuit 312 which induces strain in the optical cavities 320 of the photonic circuit 312. The elasto-optic effect produced by the expanding post 315 on the effective refractive index ($n_{eff}$) and the resonance frequency ($\omega$) of the optical cavities 320 of the photonic circuit 312 compensates for the thermo-optic effect on the effective refractive index ($n_{eff}$) and the resonance frequency ($\omega$) of the optical cavities of the photonic circuit 312. Thus, the effective refractive index ($n_{eff}$) and the resonance frequency ($\omega$) optical cavities 320 of the photonic circuit 312 remain constant despite any change in temperature.

Figures 7A, 7B:
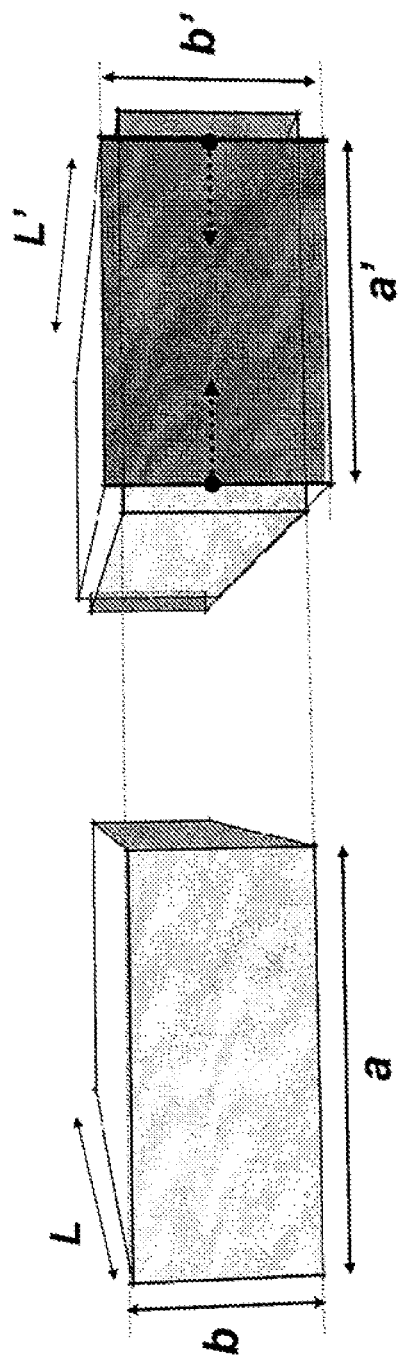
FIGS. 7A and 7B are perspective drawings that depict a waveguide, shown schematically, shown before and after physical deformation, respectively.

FIGS. 7A and 7B depict a waveguide of a photonic circuit, such as a ring resonator, shown before and after physical deformation, respectively. The quotient of the change of frequency and the change in strain, which is measure of strain sensitivity, is defined by the equation shown below. The dimensions of the waveguide are selected so as to maximize strain sensitivity $$\frac{\delta \omega}{\delta S_{xx}}.$$

$$\frac{\delta \omega}{\delta S_{xx}} = -\frac{\omega}{n_g}\left[\left(\frac{\partial n_{\textit{eff}}}{\partial n_c}\frac{\partial n_c}{\partial a}\cdot a - \sigma\frac{\partial n_{\textit{eff}}}{\partial n_c}\frac{\partial n_c}{\partial b}\cdot b + \frac{\partial n_{\textit{eff}}}{\partial a}\cdot a - \sigma\frac{\partial n_{\textit{eff}}}{\partial b}\cdot b\right) - \sigma n_{\textit{eff}}\right]$$

Using the above equation, it has been found that a waveguide having a width 'a' of between 0.1 and 0.2 microns and a height 'b' of between 0.25 and 0.45 microns has a particular high strain sensitivity $$\frac{\delta \omega}{\delta S_{xx}}.$$

Thus, the optical cavities described herein may have a width 'a' of between 0.1 and 0.2 microns and a height 'b' of between 0.25 and 0.45 microns.

In the equation above, the quantity $$\left[\left(\frac{\partial n_{\textit{eff}}}{\partial n_c}\frac{\partial n_c}{\partial a}\right)\right]$$

is a measure of elasto-optic change in waveguide effective index given uniform lateral strain associated with a change in waveguide width, a. The quantity $$\left[\left(\frac{\partial n_{\textit{eff}}}{\partial n_c}\frac{\partial n_c}{\partial b}\right)\right]$$

is a measure of elasto-optic change in waveguide effective index given uniform lateral strain associated with a change in waveguide height, b. The quantity $$\left[\left(\frac{\partial n_{\textit{eff}}}{\partial a}\cdot a\right)\right]$$

is a measure of opto-mechanical change with a change in width 'a' of the waveguide. The quantity $$\left[\left(\sigma\frac{\partial n_{\textit{eff}}}{\partial b}\cdot b\right)\right]$$

is a measure of opto-mechanical change with a change in height 'b' of the waveguide. The quantity $\lfloor \sigma n_{\textit{eff}} \rfloor$ is a measure of opto-mechanical change with a change in length 'L' of the waveguide. Additionally, it is assumed that $L'=L+\sigma \cdot S_{xx}\cdot L$; $b'=b+\sigma \cdot S_{xx}\cdot a$; and $a'=a-S_{xx}\cdot a$.

It should be understood that the application of this invention is not limited to photonic circuits having optical cavities. The teachings described herein can also be applied to solve the problems of thermal stabilization for a broader class of resonant optical devices, such as optical resonators or any other temperature sensitive optical devices or devices whose performance can be linked to a resonant process. Not all resonant processes are produced by cavities. For instance, a Fiber-Bragg grating, or more generally, a corrugated waveguide, is a resonant device which does not have a cavity. A Fiber-Bragg grating utilizes a Bragg resonance to form a narrow spectral feature or an optical resonance. Chapter 4 of Okamoto, K., Fundamentals of Optical Waveguides Academic Press, (2000) (hereinafter referred to as Okamoto), which is incorporated by reference herein, discuses Bragg resonance.

Also, resonant coupling of power may be achieved within a directional coupler, such as described in Chapter 4 of Okamoto. In such a directional coupler, phase-matching, or momentum conservation over a narrow range of frequencies, contributes to the resonant behavior of the optical response. Furthermore, interference may be used to achieve narrow resonances in the case of an arrayed waveguide grating, as described in *Fabrication of 64×64 Arrayed-Waveguide Grating Multiplexer on Silicon*, K. Okamoto, Electronics Letters, Feb. 2, 1995, Vol. 31, No. 3, the contents of which are incorporated by reference herein.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the scope of the invention.

What is claimed:

1. A passively athermal photonic system comprising:
a photonic circuit including at least one optical cavity, said cavity comprising a ring resonator, defined on a substrate;
a passive temperature-responsive structure mechanically coupled for inducing strain in the optical cavity of the photonic circuit by bending the substrate to compensate for a thermo-optic effect resulting from a temperature change in the optical cavity of the photonic circuit; and
wherein the passive temperature responsive structure includes a post that is positioned against the substrate such that the post creates a cantilever load on the substrate.

2. The passively athermal photonic system of claim 1, wherein the passive temperature-responsive structure is separate from the substrate.

3. The passively athermal photonic system of claim 1, wherein the substrate is composed of silica or silicon.

4. The passively athermal photonic system of claim 1 further comprising multiple optical cavities defined on the substrate of the photonic circuit.

5. A method of passively compensating for a temperature dependent thermo-optic effect resulting on an optical cavity of a photonic circuit, wherein the optical cavity comprises a ring resonator defined on a substrate and a passive temperature responsive structure including a post that is positioned against the substrate: comprising the step of bending the substrate by applying a cantilever load on the substrate for passively inducing strain in the optical cavity as a function of a temperature change of the optical cavity; and producing an elasto-optic effect in the optical cavity to compensate for the thermo-optic effect resulting on an optical cavity due to the temperature change.

6. The method of claim 5, wherein the elasto-optic effect and the thermo-optic effect have substantially equal and opposite effects on the refractive index and resonance frequency of the optical cavity.

7. The method of claim 5, wherein the elasto-optic effect and the thermo-optic effect occur simultaneously.

8. The method of claim 5, wherein the inducing step comprises inducing strain in multiple optical cavities of the photonic circuit.

\* \* \* \* \*